US006476785B1

(12) United States Patent
Pathak et al.

(10) Patent No.: US 6,476,785 B1
(45) Date of Patent: Nov. 5, 2002

(54) DRIVE CIRCUIT FOR LIQUID CRYSTAL DISPLAY CELL

(75) Inventors: Saroj Pathak, Los Altos Hills; James E. Payne, Boulder Creek, both of CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 09/436,064

(22) Filed: Nov. 8, 1999

(51) Int. Cl.[7] ................................................ G05B 19/42
(52) U.S. Cl. ........................................... 345/90; 345/87
(58) Field of Search .............................. 345/87, 90, 94, 345/98, 99, 100, 92

(56) References Cited

U.S. PATENT DOCUMENTS

| | | | | | |
|---|---|---|---|---|---|
| 4,870,396 | A | | 9/1989 | Shields | 340/719 |
| 5,448,258 | A | | 9/1995 | Edwards | 345/90 |
| 5,504,601 | A | * | 4/1996 | Watanabe et al. | 359/59 |
| 5,642,133 | A | | 6/1997 | Scheffer et al. | 345/147 |
| 5,666,130 | A | | 9/1997 | Willams et al. | 345/90 |
| 5,686,932 | A | * | 11/1997 | Tomita | 345/95 |
| 5,701,166 | A | | 12/1997 | Fedorovish et al. | 349/38 |
| 5,767,926 | A | * | 6/1998 | Kim et al. | 349/38 |
| 5,903,250 | A | * | 5/1999 | Lee et al. | 345/100 |
| 6,091,393 | A | * | 7/2000 | Park | 345/100 |
| 6,295,054 | B1 | * | 9/2001 | McKnight | 345/205 |

FOREIGN PATENT DOCUMENTS

| | | |
|---|---|---|
| EP | 0 617 398 | 9/1994 |
| WO | WO99/52012 | 10/1999 |

OTHER PUBLICATIONS

I–Wei Wu, "High–definition displays and technology trends in TFT–LCDs," Journal of the Society for Information Display, vol. 2, No. 1, pp. 1–14 (Apr., 1994).

* cited by examiner

*Primary Examiner*—Vijay Shankar
*Assistant Examiner*—Nitin Patel
(74) *Attorney, Agent, or Firm*—Thomas Schneck

(57) ABSTRACT

A driver circuit for use in an array of picture elements in a liquid crystal display is capable of displaying one set of image data while receiving a second set of image data. A first select switch transistor responsive to a first select signal controls the coupling of a first image to a first storage capacitor. A second select switch transistor responsive to a second select signal controls the coupling of a second image to a second storage capacitor. The first storage capacitor may be selectively coupled to an output node by means of a first enable switch transistor responsive to a first enable signal. The second storage capacitor may be selectively coupled to the same output node by means of a second enable switch transistor responsive to a second enable signal. By proper manipulation of the switch transistors, one storage capacitor may be coupled to the output node while the other storage capacitor is isolated from the output node and receiving new image data.

34 Claims, 5 Drawing Sheets

DRIVE CIRCUIT FOR LIQUID CRYSTAL DISPLAY CELL

FIELD OF THE INVENTION

The invention relates to video displays, and more particularly, to a circuit structure for a picture element for use in a liquid crystal display.

BACKGROUND ART

With reference to FIG. 1, a typical liquid crystal display consists of an array 11 of picture element 13, or pixels. Each picture element consists of a select transistor 15 for coupling a column line 17 to a storage capacitor 19. A liquid crystal 21 is placed in parallel to storage capacitor 19.

As is known in the art, the voltage potential applied to liquid crystal 21 will determine its reflectivity. In effect, the voltage potential range translates into a gray scale at liquid crystal 21. Thus by proper application of specific voltage potentials to all picture elements 13 in array 11, an image may be generated.

Row select box 25 actuates all picture elements 13 within a specific row, which is defined by a row line 27 couple to all select transistors 15 within the row. Video Signal box 23 applies a desired voltage potentials on a column lines 17. The desired voltage potentials are typically within a predetermined voltage range. The actuation of select transistor 15 transfers a column line's 17 voltage potential to a respective parallel combination of storage capacitor 19 and liquid crystal 21. Once the desired voltage has been transferred, select transistor 15 is deactivated. The combined capacitance of storage capacitor 19 and liquid crystal 21 sustain the desired voltage potential until the next image is loaded.

Several variations to the basic architecture of FIG. 1 have been previously proposed. With reference to FIG. 2, another liquid crystal architecture, more fully disclosed in U.S. Pat. No. 4,870,396 to Shields, attempts to improve the average RMS voltage potential applied to each liquid crystal 21. All elements in FIG. 2 similar to those of FIG. 1 are identified with similar reference characters and are explained above.

Each picture element 13 in FIG. 2 is capable of displaying its current contents while simultaneously receiving a new data image. This is done by means of an additional switch, load transistor 29, which is inserted between storage capacitor 19 and liquid crystal 21. In operation, select transistor 15 and load transistor 29 function as a bucket brigade transferring charge first from column line 17 to storage capacitor 19, and then from storage capacitor 19 to liquid crystal 21. In other words, select transistor 15 first transfers a voltage potential from column line 17 to storage capacitor 19 during a first phase of operation. During this phase of operation, load transistor 29 is maintained turned off and thereby isolates storage capacitor 19 from liquid crystal 21. Once new data has been loaded unto storage capacitor 19 and is ready to be displayed, a second phase of operation begins with select transistor 15 being turned off. At this time, load transistor 29 is turned on and couples storage capacitor 19 to liquid crystal 21. The charge across storage capacitor 19 redistributes itself across the parallel combination of storage capacitor 19 and liquid crystal 21. When the distributing charge has established a new voltage potential across liquid crystal 21, the second phase of operation ends with load transistor 29 being turned off. While load transistor 29 is turned off and liquid crystal 21 is holding its current voltage potential, select transistor 15 may be actuated and new data transferred from column line 17 to storage capacitor 19.

Shields explains that in order to improve the average RMS voltage value applied to array 11, one needs to control the reference voltage Vtp applied to liquid crystals 21 and to update all picture elements 13 in array 11 simultaneously. Reference voltage Vtp is coupled to the reference plate of all liquid crystals 21. By shifting reference voltage Vtp from one voltage power rail to another, as appropriate, one can increase the average voltage magnitude applied across array 11.

To this end, load transistors 29 are all controlled by a common synchronization signal 31. While load transistors 29 are turned off and liquid crystals 21 are holding their current voltage potential, storage capacitors 19 receive new data. Once the entire array 11 has received new data, synchronization line 31 is actuated and all load transistors 29 of all picture elements 13 in array 11 are turned on in unison. Thus, the entire array 11 of liquid crystals 21 is updated simultaneously.

With reference to FIG. 3 another array architecture, similar to that of FIG. 2, is shown. All elements in FIG. 3 similar to those of FIG. 2 are identified by similar reference characters and are. explained above. The architecture of FIG. 3. is more fully disclosed in U.S. Pat. No. 5,666,130 to Williams et al., and is assigned to the same assignee as that of FIG. 2. The structure of FIG. 3 updates an entire array 11 of pixels 13 simultaneously, in a manner similar to that of FIG. 2.

Unlike the structure of FIG. 2, however, the structure of FIG. 3 cannot display one image while storing another. Williams et al. explain that traditionally one has to optimize a pixel's drive circuitry to the specific type of screen, i.e. liquid crystal, being used. Williams et al. state that it would be advantageous to be able to optimize a pixel's drive circuitry separately from the type of liquid crystal used so that one driver circuit could be used with multiple types of screens.

To accomplish this, the structure of Williams et al. allow for an array 11 of picture elements 13 to receive and store an image in their respective storage capacitor 19 while maintaining the storage capacitor 19 isolated from the liquid crystal itself. In this manner, the driver circuitry of each picture element 13 may be optimize for storing an image element, i.e. voltage potential, at a respective storage capacitor 19 with no concern as to the type of liquid crystal 21 used. Once an image has been stored onto the array's storage capacitors 19, the storage capacitors 19 may be coupled to any screen type and their content, i.e. image voltage, is transferred onto the screen's liquid crystals 21. To assure that the optimized drive circuitry functions similarly on different types of liquid crystals, Williams et al. demonstrate that the liquid crystals 21 and storage capacitors 19 should be in a known reference ground condition before a new image is loaded. Thus, a current image must first be erased, i.e. array 11 is grounded, before a new image can be received.

The picture elements 13 shown in FIG. 3 are similar to those of FIG. 2 with the addition of a grounding transistor 31 between load transistor 29 and liquid crystal 21. Grounding transistor 31 is responsive to a reinitiate signal, ReInit, which grounds storage capacitor 19 and liquid crystal 21 in preparation for receiving a new image.

After storage capacitor 19 and liquid crystal 21 are grounded, grounding transistor 15 is deactivated and picture element 13 is then ready to receive new voltage data. Row select box 25 activates a row of picture elements 13 by actuating a row's select transistors 15. Select transistors 15 then transfer new voltage information from the video signal box 23 and column lines 17 to storage capacitors 19. Once new data has been placed on storage capacitors 19, load transistors 29 couple storage capacitors 19 to liquid crystals 21. Grounding transistors 31 are maintained in off state during this time. After liquid crystals 21 have displayed the image for a predetermined period, grounding transistors 31 are turned on while load transistors 29 are maintained actuated. This reinitiates storage capacitors 19 and liquid crystals 21 back to a known grounding state in preparation for loading of the next image.

Williams et al. state that their array can be made more robust by incorporating a high level of redundancy into the drive circuitry of array 11. With reference to FIG. 4, Williams et al. therefore couple two drive circuits in parallel per liquid crystal 21. All elements in FIG. 4 similar to those of FIG. 3 are given similar reference characters and are explained above. Williams et al.'s drive circuitry includes two select transistors 15*a* and 15*b* simultaneously responsive to a common row line 27, two load transistors 29*a* and 29*b* simultaneously responsive to a common load line 33, and two grounding transistors 31*a* and 31*b* responsive to the same ReInit line 35. Each select transistor 15*a* and 15*b*, however, charges its own respective storage capacitor 19*a* and 19*b*. Williams et al. thus show two storage capacitors 19*a* and 19*b* per picture element 13, with both storage capacitors 19*a* and 19*b* working in unison. If one half of the drive circuitry, identified by elements 15*a*, 19*a*, 29*a* and 31*a*, should fail, the redundant driver circuitry, i.e. 15*b*, 19*b*, 29*b* and 31*b*, would permit the picture element 13 to continue to function.

It is an object of the present invention to provide a picture element for use in a liquid crystal display capable of displaying one image while receiving another and having minimal degradation in the transferring of voltage potentials to the liquid crystal display.

It is a further object of the present invention to provide liquid crystal display with a more versatile structure.

It is yet another object of the present invention to provide a liquid crystal array. that supports both row-by-row updating of image information in the array and simultaneous updating of all rows in the array in unison.

SUMMARY OF THE INVENTION

The above objects have been met in a pixel cell structure with independent controls. A pixel cell, for use in a liquid crystal display, has the characteristic of being able to display its current contents while it is simultaneously being overwritten with a new set, or multiple sets, of data. To accomplish this, each pixel has independent access to multiple storage capacitors. While a pixel cell is displaying the contents of a first storage capacitor, the contents of a second storage capacitor can be altered. The pixel cell then switches from its first storage capacitor to its second storage capacitor. While it then displays the contents of the second storage capacitor, the contents of the first storage capacitor may be altered, and so on.

Structurally, the pixels are arranged into an array of rows and columns. In the case of a pixel with two storage capacitors, each column may be defined by one or two bitlines, depending on the embodiment being implemented. Each row is defined by a first and second wordline pair and a first and second enable-line pair. Each of the first and second wordlines in each wordline pair is independently controlled and selectively transfers the contents of a bitline to one of the first and second storage capacitors within a respective pixel cell. Similarly, each of the first and second enable-lines selectively transfers the contents of a respective one of the first and second storage capacitors to the pixel cell's output reflective panel, i.e. to a respective liquid crystal.

The first and second storage capacitors of each pixel cell have their lower plate coupled to a common predetermined voltage. The top plate of each of the first and second storage capacitors is coupled to a respective word-select pass device and to an enable-select pass device. The word-select pass device is responsive to a respective wordline within a wordline pair and selectively transfers the contents of a bitline to its corresponding storage capacitor. The enable-select pass device is responsive to a respective enable-line within an enable-line pair and selectively transfers the contents of its corresponding storage capacitor to the pixel cell's output reflective panel. Since the individual wordlines and enable-lines within each pair are independent, the liquid crystals are coupled to one of the storage capacitors in a respective pixel at all times.

Because of this diversity in control, the functionality of the present invention can be extended without altering its basic circuit structure. In a first preferred embodiment, the pixel cell of the present invention can display one set of data from a first storage capacitor while its second storage capacitor receives a second set of data. In a second preferred embodiment, proper manipulation of the individual wordlines and enable-lines allow the individual pixels to isolate a liquid crystal from a pixel cell's two storage capacitors. Thus, once a first set of data is transferred to the liquid crystal, both storage capacitors in a pixel cell may be disconnected from the liquid crystal. This permits the two storage capacitors to receive a second and third set of data while the first set of data is still being displayed. In effect, the array of pixel cells can display a current image while buffering the next two images. In this way, the speed at which the contents of each pixel may be changed is increased. It is thus possible to start writing the next image without affecting the current image being displayed.

BEST MODE FOR CARRYING OUT THE INVENTION

Figure 1:
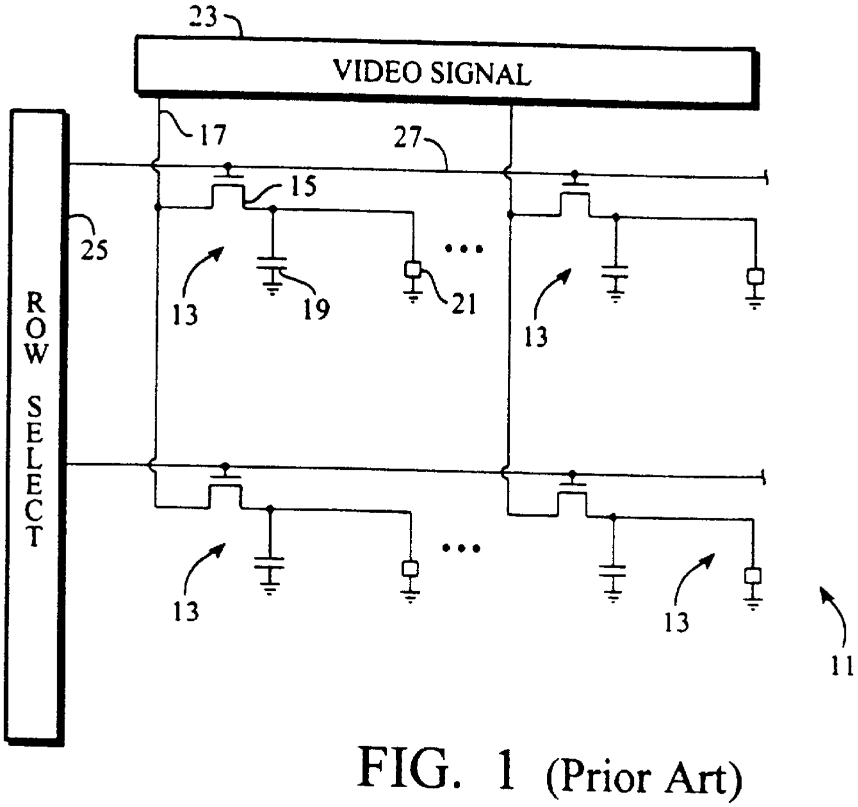
FIG. 1 (Prior Art)
FIG. 1 is prior art view of the structure of a typical pixel element in a typical liquid crystal array.
Figure 2:
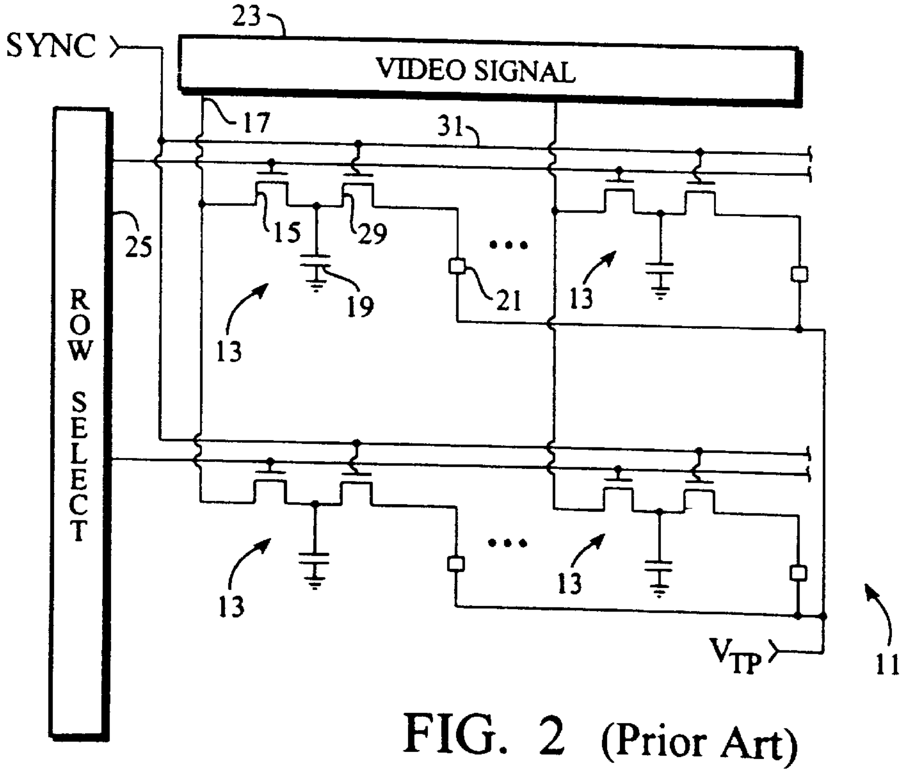
FIG. 2 (Prior Art)
FIG. 2 is a prior art view of an alternate liquid crystal array that allows a current image to be displayed while a subsequent image is being loaded.
Figure 3:
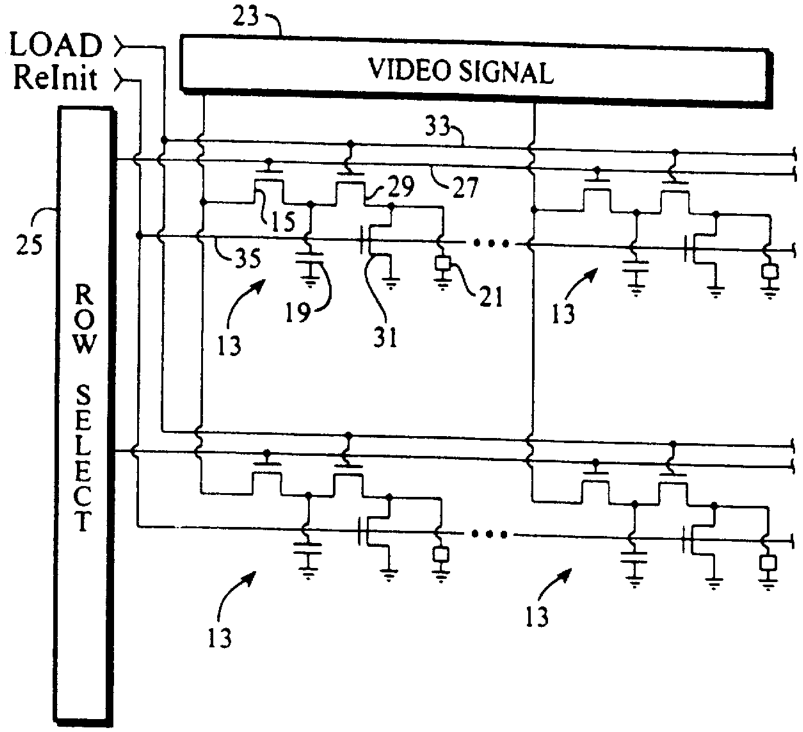
FIG. 3 (Prior Art)
FIG. 3 is a prior art view of still another liquid crystal array for separately optimizing a pixel element's drive circuitry from the pixel element's liquid crystal display.
Figure 4:
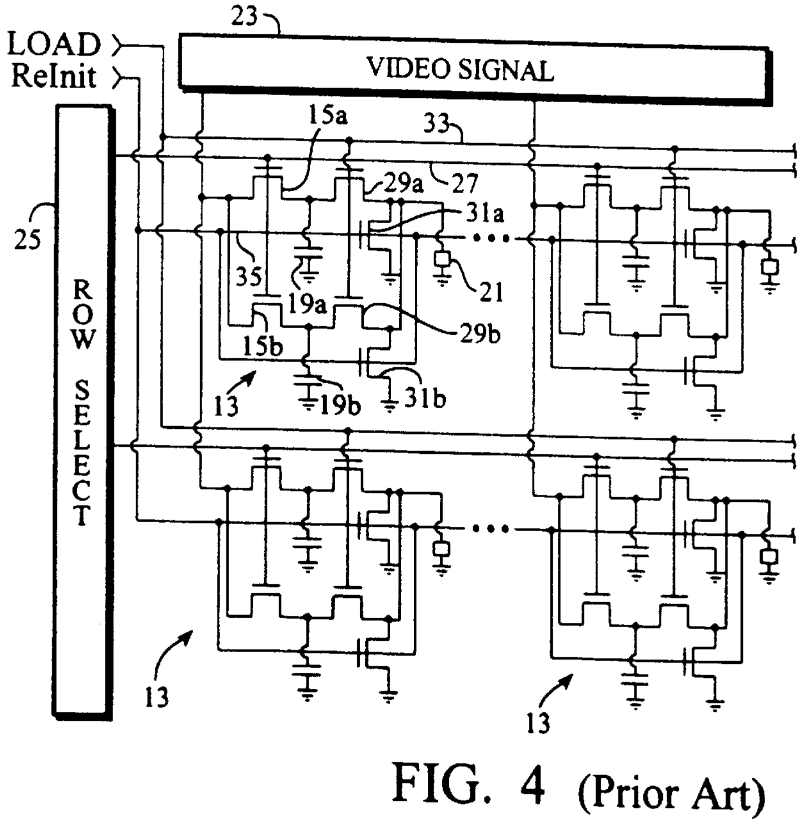
FIG. 4 (Prior Art)
FIG. 4 is an additional embodiment of the structure of FIG. 3 incorporating redundancy into the liquid crystal array.
Figure 5:
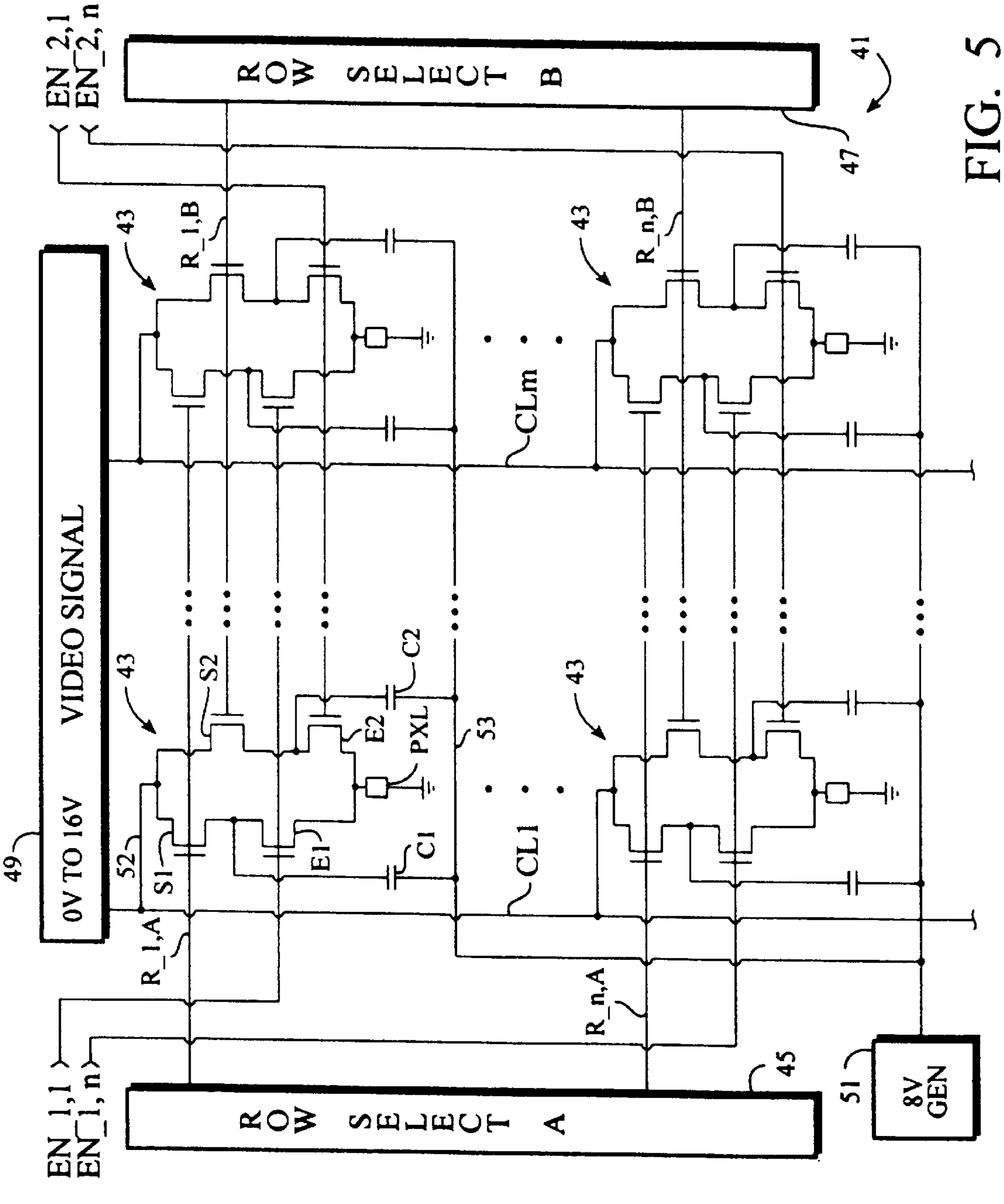
FIG. 5 is a pixel element and liquid crystal array in accord with a first embodiment of the present invention.

With reference to FIG. 5, a liquid crystal display in accord with the present invention includes an array 41 of picture cells 43, a first row selector 45, a second row selector 47, a reference voltage generator 51 and preferably a single video signal generator 49. Picture cells 43 are arranged into n rows and m columns. First row selector 45 may independently control any of the n rows by means of a first set of row select lines ranging from R_1,A to R_n,A. Similarly, second row selector 47 may independently control the same n rows by means of a second set of row select lines ranging from R_1,B to R_n,B.

Video signal generator 49 outputs m video signals on m column lines ranging from CL1 to CLm. The video signals preferably are within a voltage range of 0V through Vmax, of preferably 16V. Each column of picture cells 43 is selected by means of a corresponding column line, i.e. CL1. All picture cells 43 within a selected column have an input node 52 coupled to a corresponding, common column line, i.e. CL1. The video signal on a column line CL1, however, is not accepted by all picture cells 43 within the same column. Rather, only the picture cells 43 that are activated by a row select line from one of the first 45 or second 47 row selector will latch in the video signal data on their respective column line, CL1-CLm.

Each row within array 41 may be selected by any one of a plurality of independent row selectors 45 and 47. Preferably no two row selectors 45, 47 may select the same row at the same time. Any row, however, may be selected by multiple row selectors 45, 47 in succession. For example, in a first embodiment first row selector 45 may select the first row in array 41 by actuating row select line R_1,A and thereby load image information from video signal generator 49 onto the first row of picture cells 43. During this time, no other selector, i.e. second row selector 47, may access the first row. Once first row selector 45 has relinquished use of the first row, another row selector, i.e. second row selector 47, may gain control of the fist row by actuating its appropriate row select line, i.e. R_1,B.

Each picture cell 43 includes a liquid crystal PXL and accompanying drive circuitry. The drive circuitry selectively transfers a stored video signal from a storage means C1 and C2 onto liquid crystal PXL. The stored video signal is read from a corresponding column line CL1-CLm. In the preferred embodiment, a picture cell 43 may store multiple video signals while simultaneously displaying another. To accomplish this, each drive circuit within a picture cell 43 includes multiple voltage storage devices. In the best mode implementation, the multiple voltage storage devices are implemented as a first storage capacitor C1 and a second storage capacitor C2. This allows picture cell 43 to display the contents of one storage capacitor, i.e. C1, while storing new image information in another storage capacitor, i.e. C2. It is to be. understood that it is likewise possible to store additional image information by incorporating additional storage capacitors.

The input node 52 of each picture cell 43 may be selectively coupled to one of storage capacitors C1 and C2 by means of a corresponding select transistor S1 and S2, respectively. Each of select transistors S1 and S2 is controlled by a corresponding row select line R_1,A and R_1,B controlled by a corresponding row selector 45 and 47. Similarly, a picture cell's storage capacitors C1 and C2 may be selectively coupled to its liquid crystal PXL by means of a corresponding enable transistor E1 and E2, respectively. Each enable transistor E1 and E2 is controlled by an independent enable signal EN_1,1 and EN_2,1. Enable signal EN_1,1 controls the coupling of all the first storage capacitors C1 within row of a picture cells 43 to each cell's respective liquid crystal PXL. Similarly, enable signal EN_1,2 controls the coupling of all the second storage capacitors C2 within a row of picture cells 43 to each cell's respective liquid crystal PXL. Thus, each row is responsive to a set of enable signals EN_1,1/EN_2,1 that independently control separate enable transistors within each picture cell 43.

In the preferred embodiment of FIG. 5, array 41 is responsive to n sets of such enable signal pairs ranging from EN_1,1/EN_2,1 to EN_1,n/EN_2,n. In this preferred embodiment, however, all first enable transistors E1 within array 41 are controlled by a common first enable signal and all second enable transistors E2 are controlled by a second common enable signal. In this manner, the contents of the first C1 and second C2 storage capacitors within each cell 43 of array 41 may be transferred to their respective liquid crystal PXL in unison.

Additionally, in this presently preferred embodiment only one row selector 45 or 47 may control array 41 at any given time. For example, first row selector 45 may gain sole control of array 41 and instigate sequential loading of a first image from video signal generator 49 onto the whole of array 41 one row at a time. After first row selector 45 finishes loading the first image, it then relinquishes control of array 41 to another row selector, i.e. 47. Once second row selector 47 gains control of array 41, it can begin transferring a second image onto all the rows of array 41. While second row selector 47 has control of array 41, the first enable transistor S1 of each picture cell 43 within array 41 will be in an active state and coupling first storage capacitor C1 to liquid crystal PXL while second enable transistor 52 is in an inactive state.

As is known in the art, a voltage potential applied to liquid crystal PXL modifies its reflectivity. By appropriate application of voltage potentials to an array's liquid crystals PXL, an image may be formed. In the present embodiment, video signal generator 49 supplies the appropriate voltage potentials along column lines CL1-CLm to a desired storage capacitor C1 or C2. Since the video signals in the preferred embodiment may vary between 0V and a Vmax of 16V, this may result in a high voltage stress across storage capacitors C1 and C2 if their lower plate is tide to ground. Therefore, the presently preferred embodiment ties the lower plate of storage capacitors C1 and C2 to reference voltage generator 51, which supplies a voltage potential intermediate 0V and Vmax. Reference voltage generator 51 preferably supplies a voltage potential half-way between both extreme voltage swings of video signal generator 49. Presently, this means that reference voltage generator 51 supplies Vmax/2, or 8V, to the lower plate of all storage capacitors within array 41. Consequently, although select transistors S1 and S2 may transfer as little as 0V or as much as 16V onto the top plate of storage capacitors C1 and C2, the voltage drop across storage capacitors C1 and C2 remains within an 8V voltage swing. As a result, storage capacitors C1 and C2 may be made smaller and faster than otherwise required.

Figure 6:
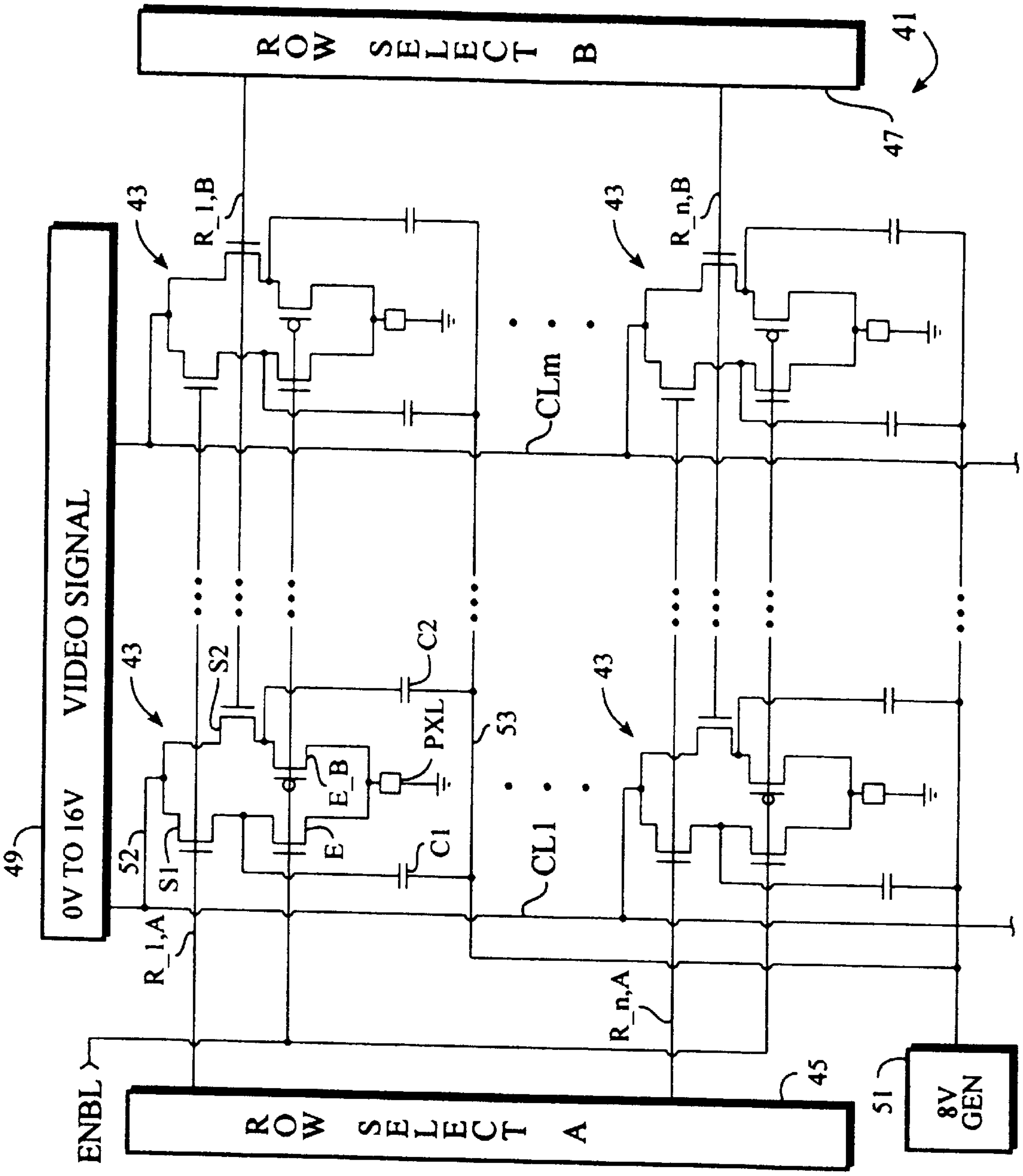
FIG. 6 is a second embodiment of a crystal array in accord with the present invention.

With reference to FIG. 6, a second embodiment of the present invention is shown. All elements in FIG. 6 similar to those of FIG. 5 are given similar reference characters and are explained above. In FIG. 6, all picture cells 43 in array 41 share a common enable signal ENBL which selectively couples one of storage capacitors C1 and C2 to liquid crystal PXL. To accomplish this, the enable transistors E and E_B within each picture cell 43 respond oppositely to the logic state of enable signal ENBL. First enable transistor E is an NMOS transistor and responds to a logic high on signal ENBL by coupling first storage capacitor C1 to liquid crystal PXL, and responds to a logic low on signal ENBL by isolating C1 from PXL. Conversely, the second enable transistor E_B is a PMOS transistors and responds to a logic high on ENBL by isolating C2 from PXL, and responds to a logic low on ENBL by coupling second storage capacitor C2 to PXL. Thus, liquid crystal PXL is constantly coupled to one of either C1 and C2, as determined by enable signal ENBL.

The embodiment of FIG. 6 is a specialized variation of that of FIG. 5. In the second embodiment of FIG. 6, only one of row selectors 45 and 47 may control array 41 at a time. For example, if first row selector 45 has access to array 41, then second row selector 47 must wait until first row selector 45 finishes loading a new image onto all of array 41, one row at a time. As explained above, first row selector 45 accesses the first storage capacitor C1 of a row of picture cells 43 by actuating the first select transistor S1 within a row of picture cells simultaneously. While first row selector 45 is loading image data into array 41, enable signal ENBL is preferably at a logic low and isolating the first storage capacitor C1 of all picture cells from their respective liquid crystal PXL. A low on enable signal ENBL also has the effect of coupling each cell's second storage capacitor C2 to their respective liquid crystal PXL. Thus, each picture cell 43 displays the contents of its second storage capacitor C2 while it receives new image data onto its first storage capacitor C1.

Once first row selector 45 has finished loading the new image into array 41 and the new image is ready to be displayed, enable signal ENBL is switched from a logic low to a logic high. This activates first enable switch E and deactivates second enable switch E_B. The newly loaded image information on first storage capacitors C1 is thereby coupled to its respective liquid crystals PXL for display. Concurrently, second storage capacitor C2 is disconnected from the liquid crystal PXL. At this point, second storage capacitor C2 is ready to receive new data and second row selector 47 may take control of array 41.

Figure 7:
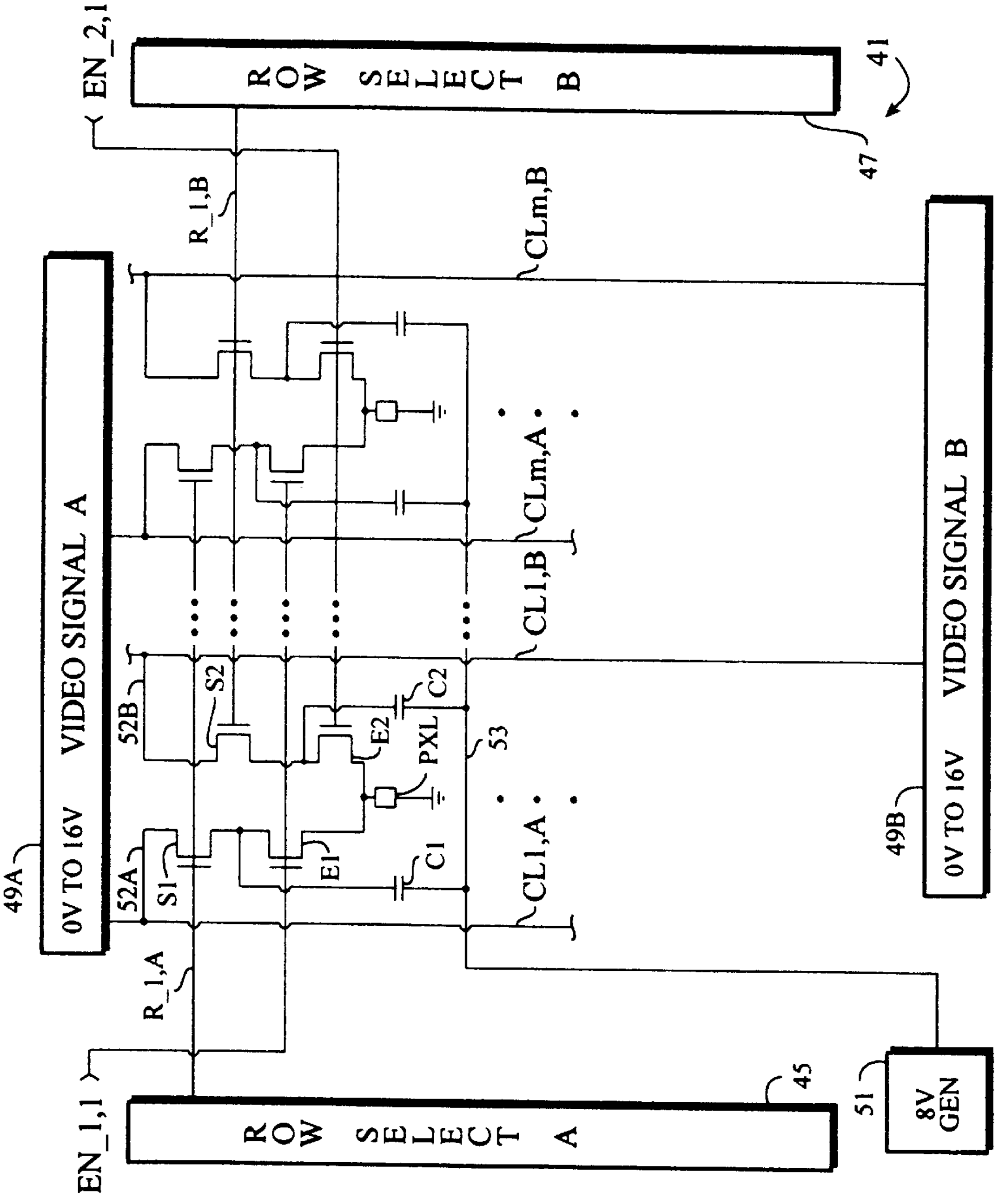
FIG. 7 is a crystal array in accord with a third embodiment of the present invention.

With reference to FIG. 7, a third embodiment of the present invention is shown. All elements in FIG. 7 similar to those of FIG. 5 are given similar reference characters and are explained above. The embodiment of FIG. 7 shows multiple video signal generators 49A/49B and preferably includes one signal generator 49A/49B for each row selector 45 and 47, respectively. Each signal generator 49A and 49B has its own set of column lines CL1,A-CLm,A and CL1,B-CLm,B, respectively, by which each has independent access to any column of picture cells 43 within array 41. Thus, each picture cell 43 includes a separate input node 52A/52B per column line CL1,A/CL1,B, respectively. A separate set of enable signals EN_1,1/EN_2,1 independently controls the enable transistors E1 and E2 of each row of picture cells 43 in a manner similar to that of the first embodiment of the first embodiment of FIG. 5.

In FIG. 7, multiple row selectors 45 and 47 have access to array 41 simultaneously, as was also the case in the first embodiment of FIG. 5. Unlike the structure of FIG. 5, however, the structure of FIG. 7 permits multiple row selectors 45 and 47 to access the same row of picture cells 43 at the same time while maintaining independent addressing of their respective storage capacitors C1 and C2. For example assuming that liquid crystal PXL has enough capacitance of its own to maintain its current image data and that it is desired to write to both of storage capacitors C1 and C2, then both enable signals EN_1,1 and EN_2,1 would be set to a logic low. This would cause both enable transistors E1 and E2 to deactivate and isolate both C1 and C2 from their respective liquid crystal PXL. It is to be understood that if a picture cell 43 included a third storage capacitor, then liquid crystal PXL could be maintained coupled to the third storage capacitor while the first C1 and second C2 storage capacitors received new data. While C1 is isolated from liquid crystal PXL, first row selector 45 may activate row line R_1,A and thereby activate first select transistor S1. This couples first column line CL1,A from first video signal generator 49A to first storage capacitor C1. Similarly, While C2 is isolated from liquid crystal PXL, second row selector 47 may activate row line R_1,B and thereby activate second select transistor S2. This couples second column line CL1,B from second video signal generator 49B to second storage capacitor C2. Since both storage capacitors C1 and C2 are coupled to separate column lines CL1,A and CL1,B, respectively, they can both receive new data simultaneously.

What is claimed is:

1. A drive circuit for use with a liquid crystal display, said driver circuit being coupled to said liquid crystal display at a region defining a picture element, said picture element having a pixel capacitance, said drive circuit comprising:

- a plurality of select switching means, each of said select switching means being independently responsive to a unique select signal, each select switching means having a first input node and a first output node, each of said switching means being effective for selectively coupling its first input node to its first output node in response to its unique select signal;
- a plurality of enable switching means, each of said enable switching means forming a one-to-one pair with a unique one of said select switching means, each enable switching means having a second input node and a second output node, each of said enable switching means being effective for selectively coupling its second input node to its second output node in response to an enable signal, the first output node and the second input node within each of said one-to-one pairs being joined together at a coupling point;
- a unique voltage storage means associated with each of said one-to-one pairs, each of said unique voltage storage means being connected between said coupling point within its associated one-to-one pair and a reference voltage input;
- all of said second output nodes being in electrical communication of said region.

2. The drive circuit of claim 1 wherein each of said enable switching means is independently responsive to a unique enable signal.

3. The drive circuit of claim 1 wherein said plurality of said enable switching means is comprised of a first enable switching means and a second enable switching means, said first enabler switching means being an NMOS transistors and said second enable switching means being a PMOS transistor, said enable signal being coupled to control both of said NMOS and PMOS transistors.

4. The drive circuit of claim 3 wherein all of said first input nodes are coupled together for receiving a video signal.

5. The driver circuit of claim 3 wherein the input node of at least two of said select switching means are coupled to different input video signals.

6. The drive circuit of claim 1 wherein all of said first input nodes are coupled together for receiving a video signal.

7. The driver circuit of claim 1 wherein the input node of at least two of said select switching means are coupled to different input video signals.

8. The drive circuit of claim 1 wherein all of said second output nodes are coupled solely to each other and to said region.

9. The drive circuit of claim 1 wherein said video signal may vary within a predetermined voltage range, said reference voltage input having a value substantially in the middle of said predetermined voltage range.

10. The drive circuit of claim 1 wherein said region is maintained coupled to at least one of said unique voltage storage means at all times by means of one of said enable switching means.

11. The drive circuit of claim 1 wherein only one of said enable switching means may be actuated at any given time.

12. The drive circuit of claim 1 wherein said voltage storage means are capacitors.

13. The drive circuit of claim 1 wherein said select switching means and enable switching means are transistors.

14. The drive circuit of claim 13 wherein said transistors are one of BJT transistors, MOS transistors and JFET transistors.

15. The drive circuit of claim 1 wherein all of said enable switching means may be opened at the same time.

16. The drive circuit of claim 1 wherein only one of said select switching means is closed at a time.

17. The driver circuit of claim 1 wherein only one of said one-to-one pairs may have its select switching means and enable switching means closed at any given time.

18. A drive circuit for use with a liquid crystal display, said driver circuit being coupled to said liquid crystal display at a region defining a picture element, said picture element having a pixel capacitance, said drive circuit comprising:

a first select switching means responsive to a first select signal, said first select switching means having a first input node and a first output node, said first switching means being effective for selectively coupling said first input node to said first output node in response to said first select signal;

a second select switching means responsive to a second select signal, said second select switching means having a second input node and a second output node, said second switching means being effective for selectively coupling said second input node to said second output node in response to said second select signal;

a first enable switching means, said first enable switching means having a third input node and third output node and being responsive to a digital enable input signal selectively alternating between a first logic state and a second logic state, said first enable switching means being effective for coupling said third input node to said third output node in response to said enable signal being at said first logic state;

a second enable switching means, said second enable switching means having a fourth input node and fourth output node and being responsive to said enable input signal, said second enable switching means being effective for coupling said fourth input node to said fourth output node in response to said enable signal being at said second logic state;

a first voltage storage means and a second voltage storage means;

said first input node being coupled to said second input node for receiving a video signal;

said first output node being coupled to said third input node, said first voltage storage means being coupled between said first output node and a reference voltage node;

said second output node being coupled to said fourth input node, said second voltage storage means being coupled between said second output node and said reference voltage node;

said third output node and said fourth output node being coupled to said region.

19. The drive circuit of claim 18 wherein said third and fourth output nodes are coupled solely to each other and to said region.

20. The drive circuit of claim 18 wherein said video signal may vary within a predetermined voltage range, said reference voltage node having a value substantially in the middle of said predetermined voltage range.

21. The drive circuit of claim 18 wherein said first and second voltage storage means are capacitors.

22. The drive circuit of claim 18 wherein said first enable switching means is an NMOS transistor and said second enable switching means is a PMOS transistor.

23. The drive circuit of claim 18 wherein only one of said first and second select switching means is closed at a time.

24. The drive circuit of claim 18 wherein said first select switching means and said first enable switching means may not be in a closed state at the same time.

25. A liquid crystal display comprising:

an array of rows and columns of pixel drive circuits, said drive circuits being effective for coupling a first video signal to a first storage means in response to first select signal and coupling a second video signal to a second storage means in response to a second select signal, each of said drive circuits further having an output node coupled to predetermined regions of said liquid crystal display, each of said regions defining a picture element;

a first row select circuit for generating said first select signals;

a second row select circuit for generating said second select signals;

an enable control input for selectively coupling one or said first and second storage means from at least one of said drive circuits to its respective output node.

26. The liquid crystal display of claim 25 wherein each of said drive circuits has an input node coupled to a column line and said first select signal is effective for loading said first video signal from said column line to said first storage means within respective drive circuits of a first row, said second select signal further being effective for loading said second video signal from said column line to said second storage means within respective drive circuits of a second row.

27. The liquid crystal display of claim 25 wherein each of said first select signals controls a first select switching means within said driver circuits, said first select switching means being effective for coupling a first column line to said first storage means, each of said second select signals further controlling a second select switching means within said driver circuits, said second select switching means being effective for coupling a second column line to said second storage means.

28. The liquid crystal display of claim 25 wherein said first row select circuit is further effective for selecting a first row of said drive circuits while said second row select circuit simultaneously selects a second row of said drive circuits.

29. The liquid crystal display of claim 25 wherein said first row select circuit and said second row select circuit are effective for selecting the same row of said drive circuits simultaneously.

30. The liquid crystal display of claim 25 wherein each of said picture elements has a pixel capacitance.

31. The liquid crystal display of claim 25 further having a plurality of said enable control inputs, each of said enable control inputs being effective for independently controlling a respective one of said rows of drive circuits.

32. The liquid crystal display of claim 25 wherein each of said driver circuits further includes a first switching means for selectively coupling its first storage means to its output node, and has a second switching means for selectively coupling its second storage means to its output node.

33. The liquid crystal display of claim 32 wherein said first switching means is an NMOS device and said second switching means is a PMOS device.

34. The liquid crystal display of claim 32 wherein said first and second switching means are responsive to separate enable control inputs.

* * * * *